Dec. 22, 1959  R. D. BOGGESS  2,918,166
ASH TRAY FOR MOTOR VEHICLES
Filed Sept. 6, 1957
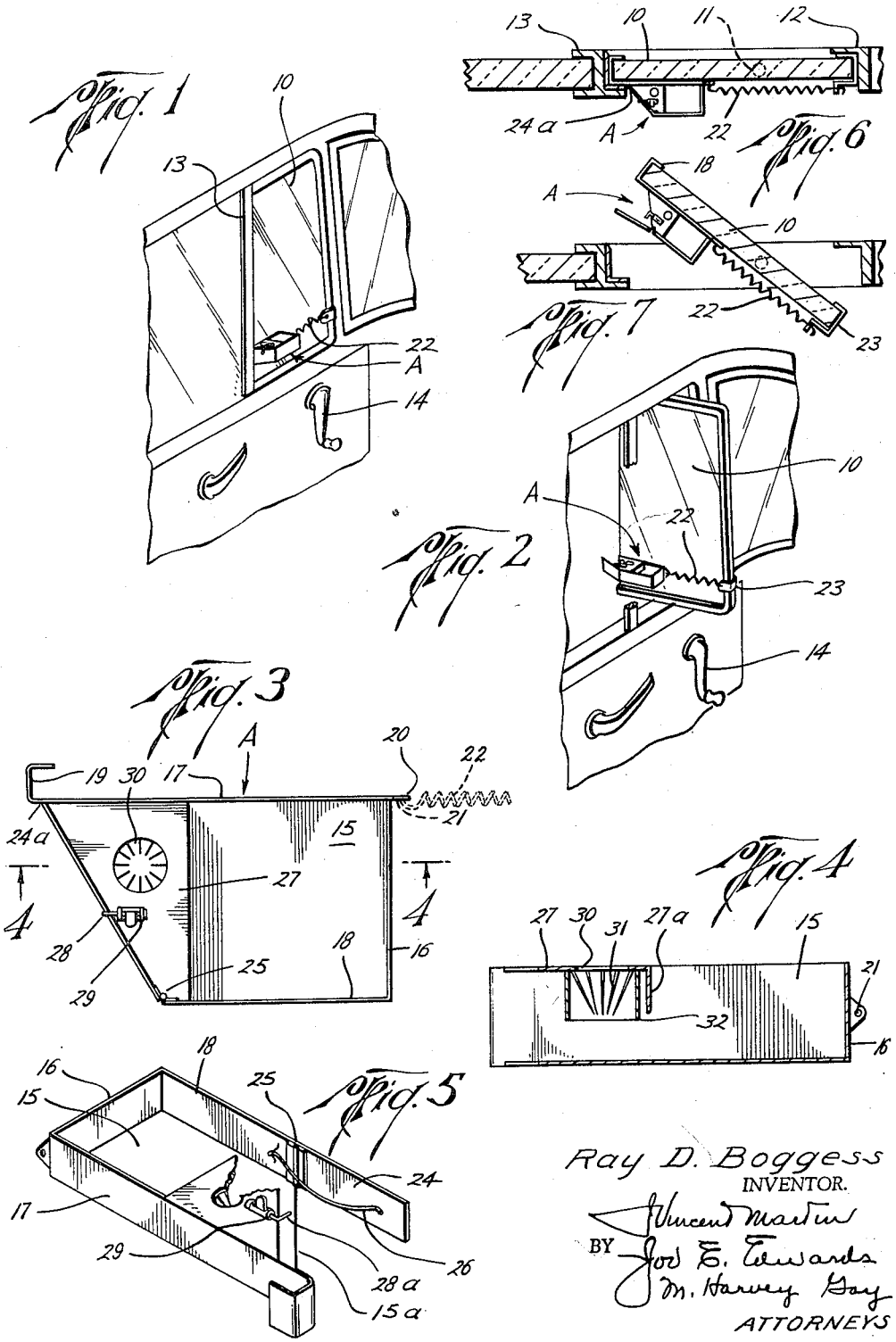
Ray D. Boggess
INVENTOR.
BY
ATTORNEYS United States Patent Office 2,918,166
Patented Dec. 22, 1959

2,918,166
ASH TRAY FOR MOTOR VEHICLES
Ray D. Boggess, Houston, Tex.
Application September 6, 1957, Serial No. 682,435
5 Claims. (Cl. 206—19.5)

This invention relates to new and useful improvements in vehicle ash trays.

The usual type of ash tray for vehicles is ordinarily mounted in the instrument panel, arm rest or some other support within the interior of the vehicle so that the ash tray as such is a permanent fixture. Since the main body or shell of the ash tray is secured in position it has become the practice to construct vehicle ash trays with an inner removable compartment or tray which must be periodically removed for emptying. Not only does this removal and replacement constitute an inconvenience but because the ash tray is permanently affixed it is not always in the most desirable or accessible place and in many instances, the permanent vehicle ash tray is most inconveniently located particularly with respect to the person driving the vehicle.

It is, therefore, one object of this invention to provide an ash tray for vehicles which overcomes the disadvantages and inconvenience of the vehicle ash trays now in general use.

An important object of the invention is to provide a vehicle ash tray which may be mounted on the usual ventilator window of the vehicle and which is constructed so that opening of the window will automatically effect an emptying of the ash tray, whereby the requirement that said ash tray be manually emptied is obviated.

Another object is to provide a vehicle ash tray having an improved mounting arrangement which permits the device to be firmly attached to the usual ventilator window of the vehicle, whereby when the tray is in mounted position it is conveniently accessible to the person adjacent the window, this being of particular advantage to the driver.

A further object is to provide a vehicle ash tray of very simple construction which will properly retain the ashes or other contents without danger of such contents being removed from the tray by strong drafts or suction.

Still another object is to construct the ash tray in such manner that the outlet through which the tray may be emptied when the window is open may, if desired, be latched closed so that no emptying of the ash tray would occur even though the window on which the tray is mounted is open.

A further object is to provide a vehicle ash tray having an improved type of snuffing means for snuffing out and removing the burning end from a cigarette prior to its being deposited in the ash tray proper.

The invention will be more readily understood from a reading of the following specification and by reference to the accompanying drawings forming a part thereof, wherein an example of the invention is shown and wherein:

Figure 1 is a partial isometric view of the usual ventilator window of a vehicle and showing an ash tray, constructed in accordance with the invention, mounted on said window, Figure 2 is a similar view with the window open, Figure 3 is a plan view of the ash tray, Figure 4 is a longitudinal sectional view, taken on the line 4—4 of Figure 3, Figure 5 is an isometric view of the ash tray with its outlet gate in an open position, and Figures 6 and 7 are horizontal cross-sectional views illustrating the position of the ash tray outlet gate with the window closed in Figure 6 and the window open in Figure 7.

In the drawings the numeral 10 designates the usual small ventilator window of a motor vehicle. As is well known, this ventilator window is mounted upon a vertical pivot 11 and, when in a closed position, has its forward end abutting the vertical frame member 12 of the vehicle, with its rear portion abutting or engaging a vertical post 13 which extends between the upper and lower frame members of the vehicle window. The closed position of the ventilator window is illustrated in Figure 6 and said window is normally actuated by a crank 14 within the interior of the vehicle and when swung to an open position, the ventilator window is as shown in Figures 2 and 7.

The improved ash tray, constructed in accordance with the present invention, is generally indicated by the letter A and said ash tray is adapted to be mounted on the inner surface of the ventilator window 10. The tray, as shown in Figures 1 and 2, is located adjacent the rear portion of the ventilator window at its lower end and in such position is readily accessible to the person sitting adjacent the vehicle window. When the ash tray is mounted on the ventilator window adjacent the driver's side, said tray is accessible to the person driving the vehicle. As will be explained, the ash tray is arranged to coact with the vertical post or support 13 so that the ash tray provides a closed compartment when the window is in its closed position (Figure 6) but may be arranged to automatically open at one side to provide for automatic emptying of the ash tray when the ventilator window 10 is moved to an open position.

Referring to Figures 3 to 7, the device comprises a generally rectangular shaped tray which includes a bottom 15, a forward end wall 16 and parallel side walls 17 and 18. The side wall 17 may be referred to as the outer wall because it is adapted to be located contiguous or in engagement with the inner surface of the ventilator window. The wall 17 is of greater length than the wall 18 and has its rear portion bent upon itself to form an engaging hook 19 which is arranged to engage the rear vertical edge of the ventilator window 10 (Figures 6 and 7). The forward end of the wall 17 may be formed with an ear 20 having an opening 21 therein. This opening receives one end of a coil spring 22 and the opposite end of said spring is fastened to an angular clip 23 which is engageable over the forward vertical edge of the ventilator window. It will be evident that when the hook 19 is engaged with the rear edge of the window and the clip 23 is engaged with the forward end, the tension of the spring will maintain the device A in position on the window. It is also pointed out that it is preferable to mount the device A at an inclination so that the forward wall of the tray 16 is at a higher elevation in a horizontal plane than the rear portion thereof; this causes any material deposited in the tray to move by gravity toward the rear portion thereof.

The rear wall 24 of the tray is not made integral with the other walls and bottom but rather has one end pivoted at 25 to the inner or shorter side wall 18 of the tray. A spring 26 normally urges the rear wall 24 outwardly in the manner shown in Figure 5. Although a leaf type spring 26 is illustrated, it is evident that a suitable coil spring could be incorporated in the pivot 25 to accomplish the purpose of normally urging the pivoted wall in an outward direction.

Since the side wall 17 of the tray, which is adjacent the surface of the window 10, is longer than the side wall 18, the rear wall 24, when in its closed position, is not at a right angle to the side walls but instead extends at the angle illustrated in Figure 3. The rear edge 15a of the bottom 15 of the tray is disposed at this same angle whereby the wall 24 engages said edge to close the rear portion of the tray when the wall is in closed position.

To prevent the contents of the tray from being blown out of said tray by a direct air current or by suction, a horizontal transverse plate element 27 extends across the rear portion of the tray. As shown in Figure 3, the plate is generally triangular in shape and has its sides secured to the upper portions of the side walls; said plate, side walls and the rear wall thus form a compartment space with the rear portion of the tray. The forward end of the plate is preferably turned down to form a downwardly directed flange 27a. When the tray is disposed at a slight incline, the contents of said tray will fall by gravity into a position below the plate 27 and will thus be retained until such time as the rear wall 24 is swung outwardly to permit their discharge.

For latching the rear wall 24 in closed position against the action of the spring 26, an angular latch pin 28 is mounted within a suitable collar 29 which is suitably secured to the upper end of the plate 27. The latch pin 28 has an angular end 28a and when the pin 28 is rotated to cause the end 28 to overlie the edge of the wall 24 (Figure 3), the rear wall 24 is maintained in closed position. When the pin 28 is rotated to move its end 28a out of engagement with wall 24, the spring 26 is free to move the wall outwardly on its pivot 25.

When the device is mounted in position on the ventilator window in the manner shown in Figures 1 and 6, and the window 10 is in closed position, the extreme outer edge portion 24a of the rear wall 24 is engaged by the edge of the vertical post or support 13 against which the rear portion of the window abuts. Therefore, the post or support 13 coacts with the rear wall to maintain it in a position closing the rear end of the tray to retain the contents of the tray. At this time the latch pin 28 may be rotated to disengage its end 28a from the wall 24 and said wall will be retained in closed position by its engagement with the post or support.

The ash tray may then be used in its usual manner and ashes and other material deposited therein, because the tray is preferably disposed at an angle, will fall downwardly and will be retained in the rear portion of the tray beneath the plate 27.

When it is desired to empty the tray, it is only necessary to swing the ventilator window to an open position. Because the rear wall 24 is at an angle, the window 10 may swing outwardly and the ash tray will clear the supporting post in the manner illustrated in Figure 7. Since the tray clears the post 13, the spring 26 will swing the rear wall 24 to open the rear end of the tray. The contents, acted upon both by gravity and by the suction created by the movement of the vehicle, will be discharged from the tray. Upon closing of the ventilator window 10, the end portion 24a of the pivoted wall 24 will again be engaged by the post 13 and will return the rear wall to its closed position, whereby the tray is again ready for use. It is pointed out that the latch 28 is provided in order to hold the rear wall 24 in its closed position in the event it is desired to drive with the ventilator window in open position. Emptying of the ash tray under these circumstances could be effected by manually operating the latch to allow the rear wall to swing to open position.

In order to provide a simple and effective means for removing the lighted end from a cigarette prior to its being deposited in the tray, the plate 27 may be provided with a circular opening 30 which is larger than the diameter of a cigarette. Secured to the under side of the plate 27 (Figure 4), are a plurality of flexible pins 31, which have their lower ends sharpened, preferably to a point. The pins are arranged circumferentially around the opening and have their lower ends inclined inwardly whereby a cigarette, pushed downwardly through opening 30, must first spread the pins. Upon being withdrawn from the opening, the lower sharpened ends of the pins move inwardly and engage the cigarette so that an upward pull will actually remove that portion of the cigarette which was initially located below said pins. Such removed portion, which would, of course, be the lighted end, would drop into the bottom of the tray below the shelf 27. In order to prevent accidental engagement of the sharpened pins by the fingers of a person cleaning the tray, a suitable guard collar 32 surrounds said pins and has its lower end in a plane below the sharpened points.

From the foregoing, it will be seen that a very simple ash tray device is provided. It may be quickly and easily mounted upon the usual ventilator window of a motor vehicle and is arranged to be automatically emptied at any time that the window is swung to an open position; at the same time, the tray is closed automatically when the window is closed. The clip arrangement, which mounts the device, makes it possible to easily remove the same when the vehicle is being washed or for other reasons. It is, of course, understood that the device may be made of any suitable fireproof material and may be of any desired size within the limits of the window to which it is attached. Although a simple rotatable pin type latch is illustrated, it is obvious that various types of manually actuated latches could be employed for holding the rear wall 24 in closed position when it is not desired that the wall operate automatically in accordance with the window position.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. In combination with a vehicle window which is mounted to pivot about a vertical axis and which has its rear vertical edge abutting a vertical support, an ash tray adapted to be mounted on the inner surface of said window and including, a tray section formed of a forward wall and two side walls, one of said side walls engaging the inner surface of the window, and a rear wall pivoted to one of the side walls, said rear wall being engaged by the vertical support when the window is in closed position to retain said rear wall in position closing the rear side of the tray.

2. In combination with a vehicle window which is mounted to pivot about a vertical axis and which has its rear vertical edge abutting a vertical support, an ash tray adapted to be mounted on the inner surface of said window and including, a tray section formed of a forward well and two side walls, one of said side walls engaging the inner surface of the window, a rear wall pivoted to one of the side walls, said rear wall being engaged by the vertical support when the window is in closed position to retain said rear wall in position closing the rear side of the tray, and resilient means constantly urging the rear wall outwardly toward open position, whereby when the vehicle window is moved about its pivot to an open position said rear wall is disengaged from the vertical support and said resilient means automatically swings the rear wall outwardly to open the rear side of the tray and permit discharge of its contents.

3. The combination set forth in claim 2, together with a manually operable latch means for latching the rear wall in closed position, whereby it remains closed regardless of the position of the vehicle window.

4. The combination set forth in claim 2, wherein the ash tray is mounted at an incline from a horizontal plane with the rear end of said tray lower than the forward end, whereby an automatic discharge of the contents of the tray may be effected upon swinging of the rear wall to an open position.

5. The combination set forth in claim 2, together with a transverse horizontally disposed plate extending between the side walls at the upper end thereof and overlying the rear portion of said tray.

References Cited in the file of this patent

UNITED STATES PATENTS

| | | |
|---|---|---|
| 1,532,363 | Berger | Apr. 7, 1925 |
| 1,921,874 | Glomb | Aug. 8, 1933 |
| 2,095,870 | Hirsch | Oct. 12, 1937 |
| 2,303,980 | Bonbright | Dec. 1, 1942 |
| 2,364,078 | Kisselle et al. | Dec. 5, 1944 |
| 2,459,459 | Seaman | Jan. 18, 1949 |
| 2,646,164 | Mermelstein | July 21, 1953 |